United States Patent [19]

Chapman et al.

[11] Patent Number: 5,415,557
[45] Date of Patent: May 16, 1995

[54] BUSWAY TAP OFF BASE ASSEMBLY FOR PREVENTING THE INGRESS OF DUST AND LIQUIDS

[75] Inventors: Donald L. Chapman, Liberty, Ind.; Debora L. Good, Raleigh, N.C.; Michael S. Young, Cincinnati, Ohio

[73] Assignee: Square D Company, Palatine, Ill.

[21] Appl. No.: 113,564

[22] Filed: Aug. 27, 1993

[51] Int. Cl.⁶ ........................................ H01R 13/447
[52] U.S. Cl. ................................................. 439/142
[58] Field of Search ............... 439/135, 142, 207, 211, 439/212, 213

[56] References Cited

U.S. PATENT DOCUMENTS

| | | | |
|---|---|---|---|
| 2,420,103 | 5/1947 | Smith | 439/142 |
| 3,004,175 | 10/1961 | Weiss | 439/212 |
| 3,140,344 | 7/1964 | Slater et al. | 439/142 |
| 4,456,145 | 6/1984 | Frank | 439/142 |
| 4,673,229 | 6/1987 | Jorgensen | 439/207 |
| 4,714,431 | 12/1987 | McGoldrick et al. | 439/212 |
| 4,820,177 | 4/1989 | Slicer | 439/207 |
| 5,192,217 | 3/1993 | Wittmer | 439/135 |

*Primary Examiner*—Neil Abrams
*Attorney, Agent, or Firm*—Larry I. Golden; David R. Stacey

[57] ABSTRACT

A tap-off base assembly of the present invention provides protection against the ingress of dust and liquids into an electrical busway distribution system of the type having access openings for receiving power tap-off devices. The tap-off base assembly includes a base molded from an electrically insulating material and a pivotally attached door. A tap-off opening seal is placed on the housing around the tap-off opening. The base is slidably received in the busway tap-off opening such that the seal is compressed thereby sealing the tap-off opening. The base has a planar outside surface which includes a number of access openings. Each access opening provides access to one the electrical conductors contained within the busway housing. The door may be selectively moved between an open position which provides access to the electrical conductors and a closed position which prohibits access to the conductors. The door also has a flange around its perimeter and a sealing rib which extend outward from the inside surface of the door. When the door is in the closed position the flange overlaps an edge portion of the base and the sealing ribs are pressed against a gasket in the planar outside surface of the base which surrounds the access openings thereby sealing the access openings and preventing the ingress of dust and liquids into the busway housing. A latch is provided for securing the door in its closed position.

8 Claims, 6 Drawing Sheets

BUSWAY TAP OFF BASE ASSEMBLY FOR PREVENTING THE INGRESS OF DUST AND LIQUIDS

FIELD OF THE INVENTION

This invention relates to the technology of electrical busway distribution systems, and specifically to busway distribution systems having provisions for the connection of tap-off devices.

BACKGROUND OF THE INVENTION

The present invention is directly related to and is an improvement of the tap-off base assembly disclosed in U.S. Pat. No. 4,714,431, issued Dec. 22, 1987 and U.S. Pat. No. 5,192,217 issued Mar. 9, 1993. The tap-off base assemblies of U.S. Pat. Nos. 4,714,431 and 5,192,217 are directly associated with the electrical distribution systems disclosed in U.S. Pat. Nos. 4,673,229 issued Jun. 16, 1987 and 4,820,177 issued Apr. 11, 1989. Each of the previously referenced patents are assigned to the same assignee as the present invention and are incorporated by reference for the description of common features and applications.

It is common in the art of electrical busway distribution systems to include provisions for the installation of tap-off units at intervals along the busway housing. These provisions generally include a number of tap-off openings spaced at set intervals along the busway housing whereby access to the conductors enclosed within the housing is obtained. Each tap-off opening requires a tap-off base assembly. The tap-off base assembly includes a base, generally molded from an electrically insulating material, and a door. The tap-off base provides support for the conductors enclosed within the housing and includes a number of access openings through which the electrical connection of a tap-off device is made. The door provides a means for closing the access openings when a tap-off unit is not installed on the base. The door, when properly latched in the closed position, will prevent unintentional finger contact with the conductors inside the busway housing. A base as described and claimed in U.S. Pat. No. 5,192,431 will also prevent unintentional finger contact with the conductors while the door is in the open position. Both the door and base described above will provide an rating of IP-2X, as defined in IEC 529. The IP-2X rating, however, does not address the ingress of objects smaller than 12.5 mm or the ingress of water. In many applications it is required that other foreign objects smaller than 12.5 mm and water must be prevented from entering the busway housing.

SUMMARY OF THE INVENTION

In many busway installations it is desirable to have a busway enclosure rated higher than IP-2X. The present invention provides a tap-off base assembly having a rating of IP-54. The IP-54 rating as defined in IEC 529 prohibits the ingress of dust and water sprayed from a nozzle capable of delivering water at a rate of 10 l/min. through an angle of ±180° for a period of 5 minutes. The base assembly includes a base seal placed between the base assembly and the busway housing at the tap-off opening and an access opening seal between the door and the tap-off base.

Other features and advantages of the invention will become apparent to those skilled in the art upon review of the following detailed description, claims and drawings.

Figure 1:
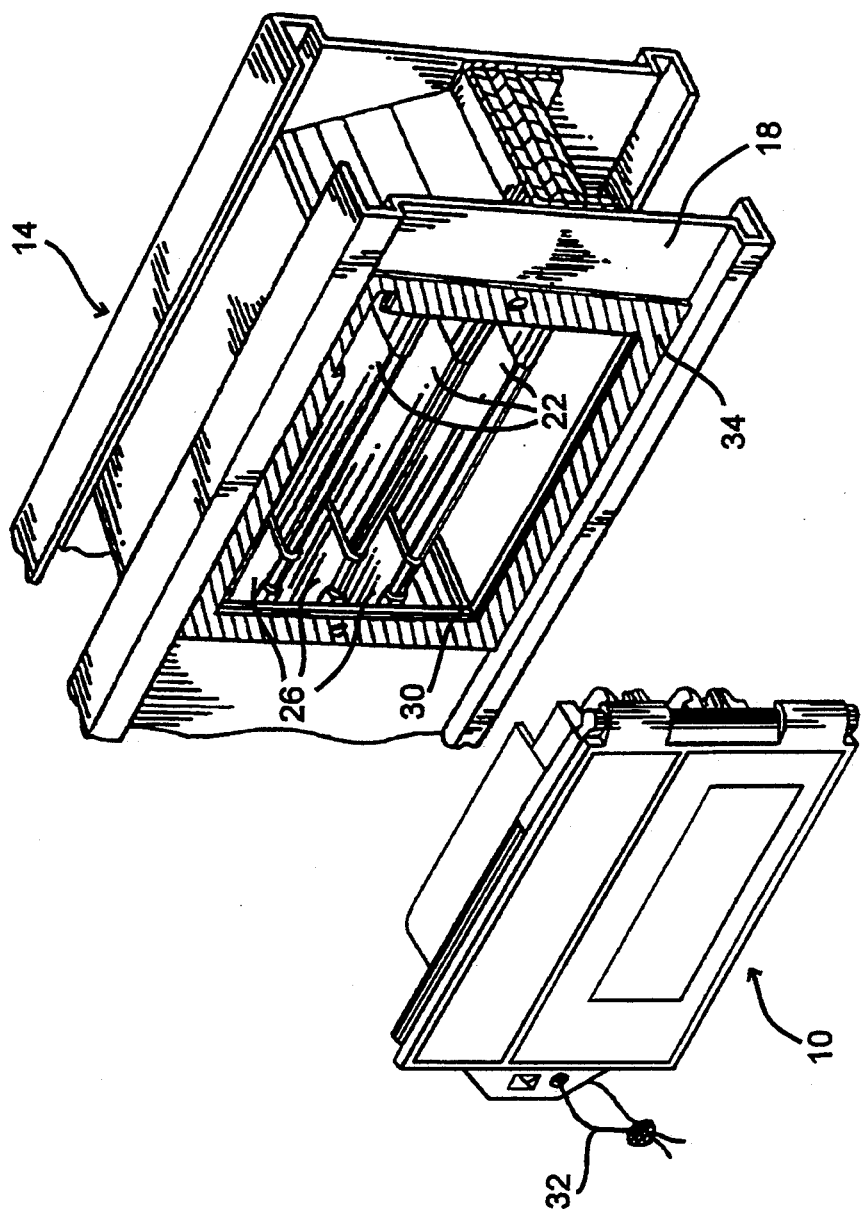
FIG. 1 is an isometric view of a segment of electrical busway section showing one electrical tap-off opening and a tap-off base assembly of the present invention including the base seal.

Before one embodiment of the invention is explained in detail, it is to be understood that the invention is not limited in its application to the details of construction and description or illustrated in the drawings. The invention is capable of other embodiments and of being practiced or being carried out in various other ways. Also, it is to be understood that the phraseology and terminology used herein is for the purpose of description and should not be regarded as limiting.

DESCRIPTION OF THE PREFERRED EMBODIMENT

Referring to FIG. 1, the tap-off base assembly of the present invention, generally indicated by the reference number 10, is employed in an electrical busway distribution systems having provisions for installing power tap-off devices. The busway distribution system is made up of a number of busway sections, each section being connected to an adjacent section such that electric power may be distributed from a power source to various points throughout a building. A portion of one section of the described busway distribution system is generally identified by the reference numeral 14. Each section of busway includes a housing 18 enclosing a plurality of conductors 22. Each conductor 22 is enclosed in an electrically insulating sheath 26 which electrically insulates the conductors from one another and from the housing 18. The housing 18 provides support and protection for the conductors 22. A number of tap-off openings 30 are spaced at intervals along the housing 18. In some applications only one tap-off opening 30 may be provided in a busway section. The tap-off openings 30 provide access to the conductors 22 enclosed within the housing 18 for the purpose of electrically connecting a power tap-off unit. Each tap-off opening 30 requires one tap-off base assembly 10 for proper operation. The base assembly 10 provides electrical separation and support for the conductors 22 and serves as a platform for any power tap-off unit which might be installed at that tap-off opening 30. A tap-off opening gasket 34 is placed on the housing 18 such that is surrounds the tap-off opening 30. The base assembly 10 is slidably received within the tap-off opening 30 such that the tap-off opening gasket 34 forms a seal between the housing 18 and the base assembly 10. The base assembly 10 is also provided with a means to install a sealing wire 32 to indicate unauthorized use of the base assembly 10.

Figure 2:
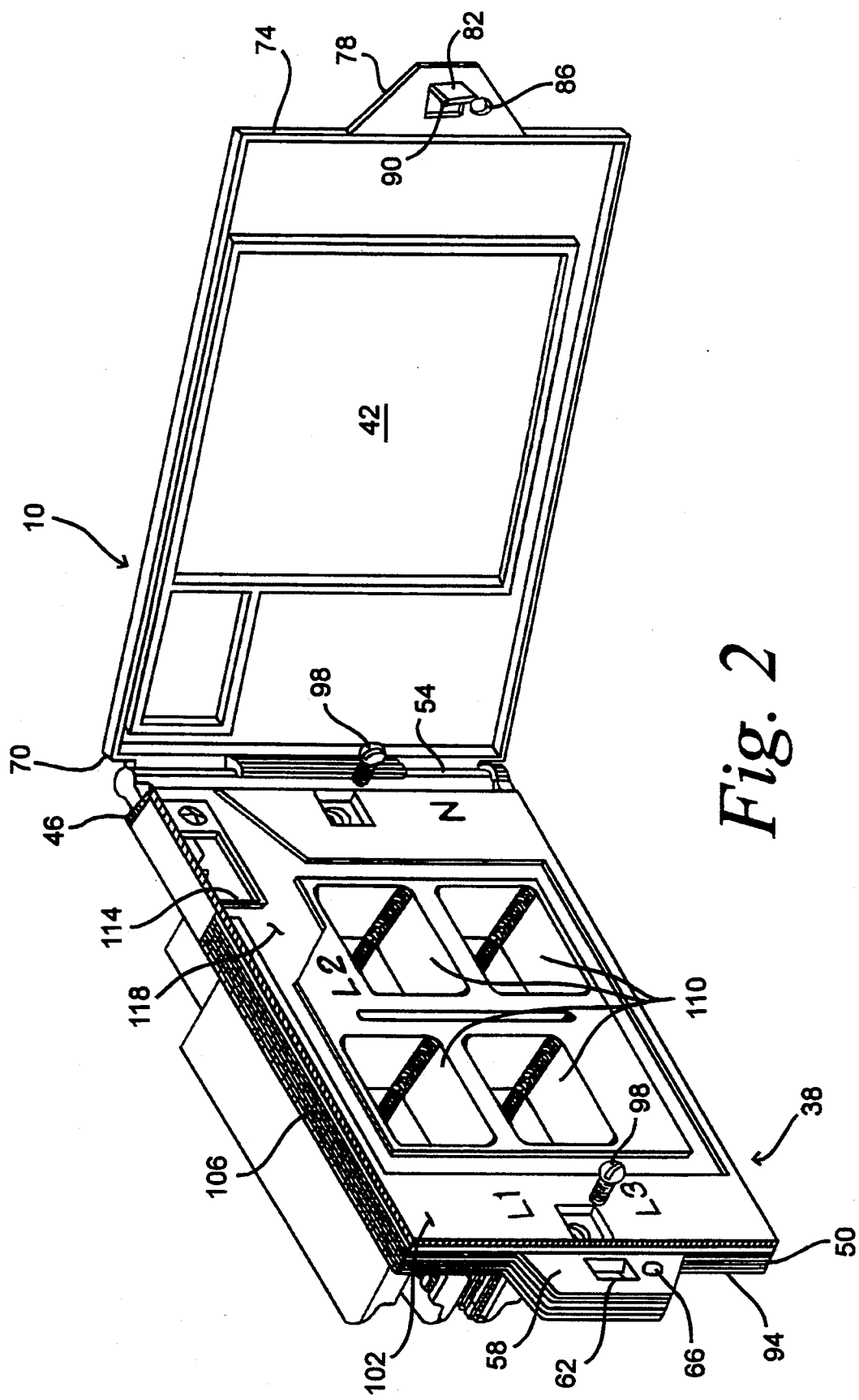
FIG. 2 is an isometric view of a tap-off base assembly of the present invention with the cover open showing the gasket recess in the face of the base and the sealing ribs in the cover which coincide with the sealing gasket.

Referring now to FIG. 2, a first embodiment of a tap-off base assembly 10 of the present invention includes a base 38 made from an electrically insulating material and a door 42. The base 38 has a first end generally indicated by the reference numeral 46 and a second end generally indicated by the reference numeral 50. The first end 46 has an integral hinge pin 54. The second end 50 has a latch tab 58 which extends outward from the base 38 and includes a latch hole 62 and a sealing wire hole 66. The door 42 has a hinging end 70 which pivotally attaches to the hinge pin 54 such that the door 42 may be selectively moved between a closed position as shown in FIG. 1 and an open position as shown in FIG. 2. The door 42 also has a latching end 74 which has a latch tab 78 extending outward from the latching end 74. The latch tab 78 of the door 42 is generally aligned with the latch tab 58 of the base 38 when the door 42 is in the closed position. The latch tab 78 of the door 42 has an integrally formed pivotal latching lever 82 which communicates with the latch hole 62 of the base 38, and a sealing wire hole 86. The latching lever 82 includes a hook-like projection 90 at its distal end. The hook-like projection 90 engages a portion of the latch tab 58 immediately adjacent to the latch hole 62 such that the door 42 is retained in the closed position. The hook-like projection 90 of the latching lever 82 may be disengaged from the latch tab 58 by pivoting the latching lever 82 with a tool such as a screw driver. When the door 42 is secured in the closed position by the latching lever 82 a sealing wire 32 as illustrated in FIG. 1, or a small pad lock, may be place through the aligned sealing wire holes 66 and 86 to prevent unauthorized opening of the door 42.

The base 38 has a sealing surface 94 which generally conforms with the shape of the housing 18 around the tap-off opening 30. The sealing surface 94 presses tightly against the tap-off opening gasket 34 as the base assembly 10 is slidably received in the tap-off opening 30 and secured by screws 98. The tap-off opening gasket 34 seals any gap between the housing 18 and the base 38 thereby preventing the ingress of dust or liquids into the busway section.

The base 38 also has a planar outside surface 102 spaced apart from the sealing surface 94 by an edge 106 which generally forms the perimeter of the base 38. Four generally square access openings 110 are provided in the outside surface 102 of the base 34. When a base assembly 10 is installed in a tap-off opening 30 each access opening 110 provides access to one of the conductors 22 within the busway housing 18. The access openings 110 provide a means by which a power tap-off unit can make an electrical connection with the conductors 18. A ground access opening 114 is also provided in the outside surface 102 of the base 38 for making the electrical ground connection between the power tap-off unit and the busway housing 18 which serves as the ground conductor for the system. A door gasket recess 118 in the outside surface 102 of the base 38 surrounds the access openings 110 and ground opening 114.

Figure 3:
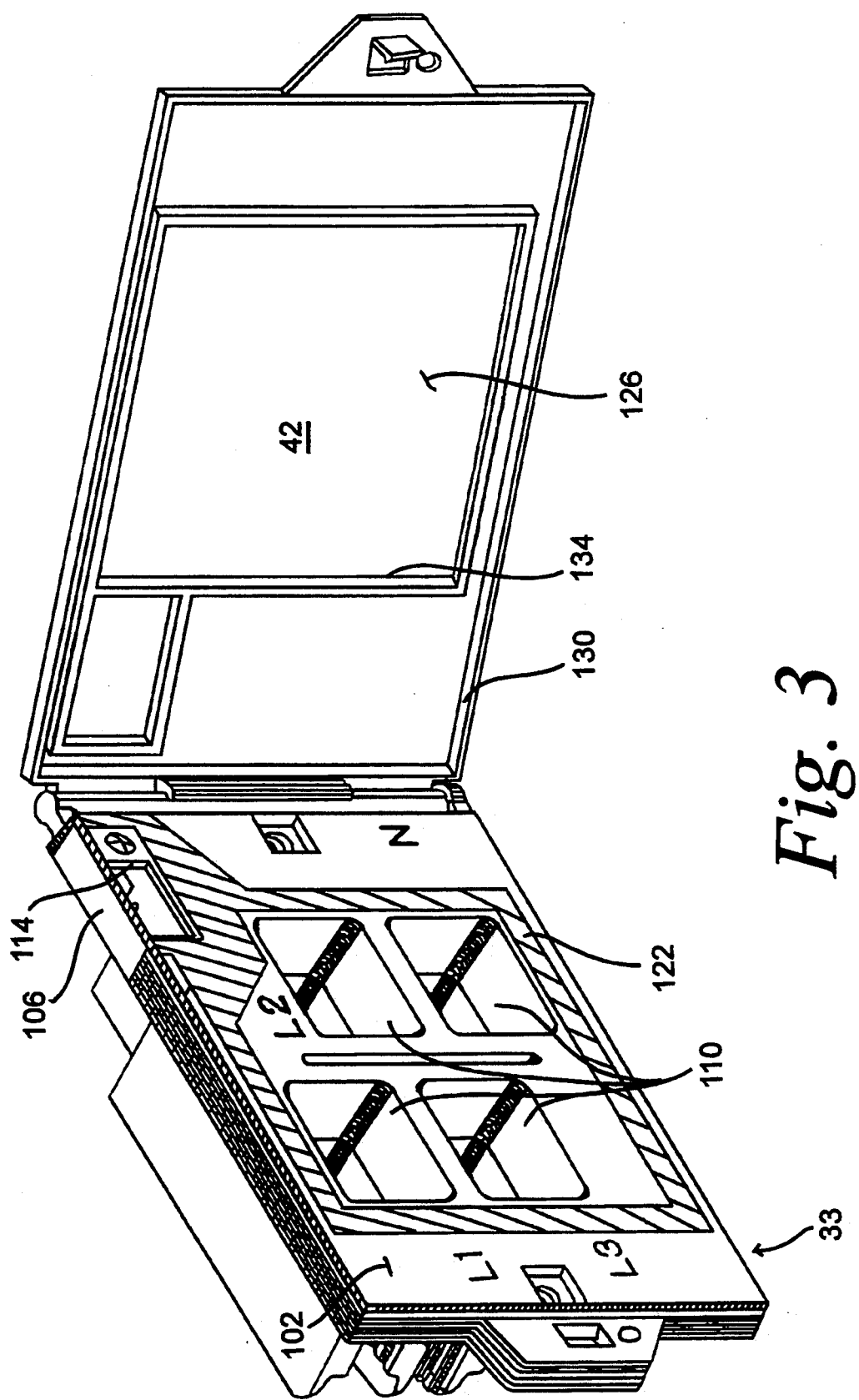
FIG. 3 is an isometric view of a tap-off base assembly of FIG. 2 with the sealing gasket installed.

Referring now to FIG. 3, a door gasket 122 is placed in the door gasket recess 118 such that the gasket 122 surrounds the access openings 110 and ground opening 114. The door 42 includes an inside surface 126 which is generally planar and juxtaposed to the planar outside surface 102 of the base 38 when the door 42 is in the closed position. A flange 130 extends generally perpendicularly to and outwardly from the inside surface 126 along the perimeter of the door 42. A sealing rib 134 extends perpendicularly to and outwardly from the inside surface 126 of the door 42 in the same direction as the flange 130. The sealing rib 134 is shaped to surround the access openings 110 and the ground opening 114. When the door 42 is latched in the closed position the flange 130 overlaps the edge 106 of the base 38 and the sealing rib 134 is pressed into the door gasket 122 thereby sealing the access openings 110 and the ground opening 114.

Figure 4:
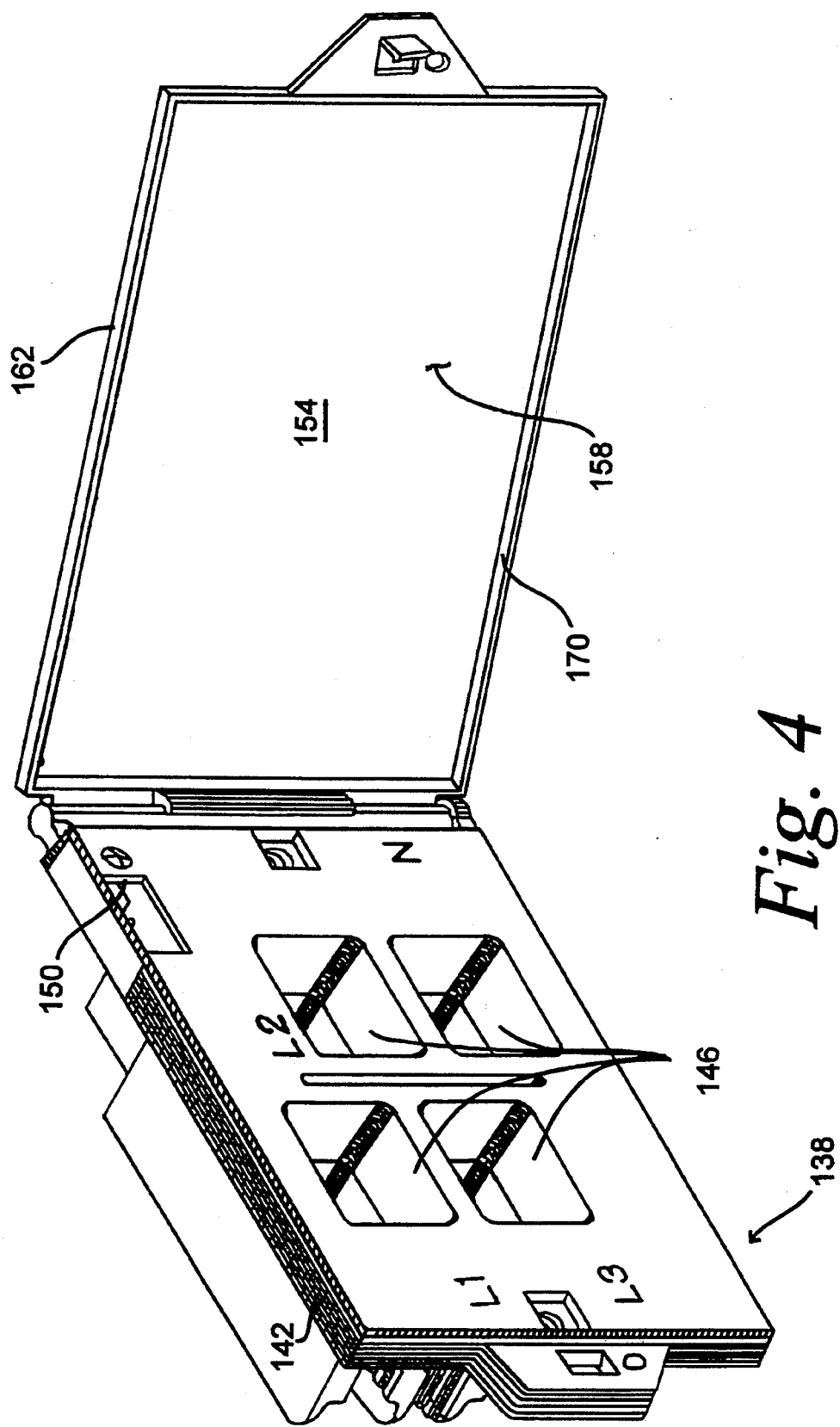
FIG. 4 is an isometric view of a tap-off base assembly of the present invention showing a sealing ring attached to the door.
Figure 5:
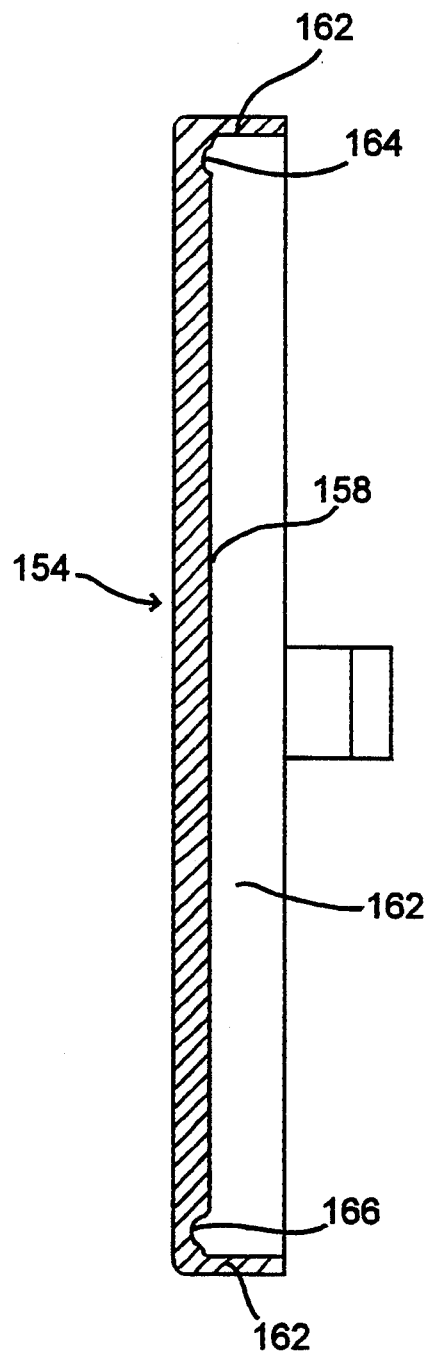
FIG. 5 is a cross-sectional view of the door of FIG. 4 showing the sealing ring groove.
Figure 6:
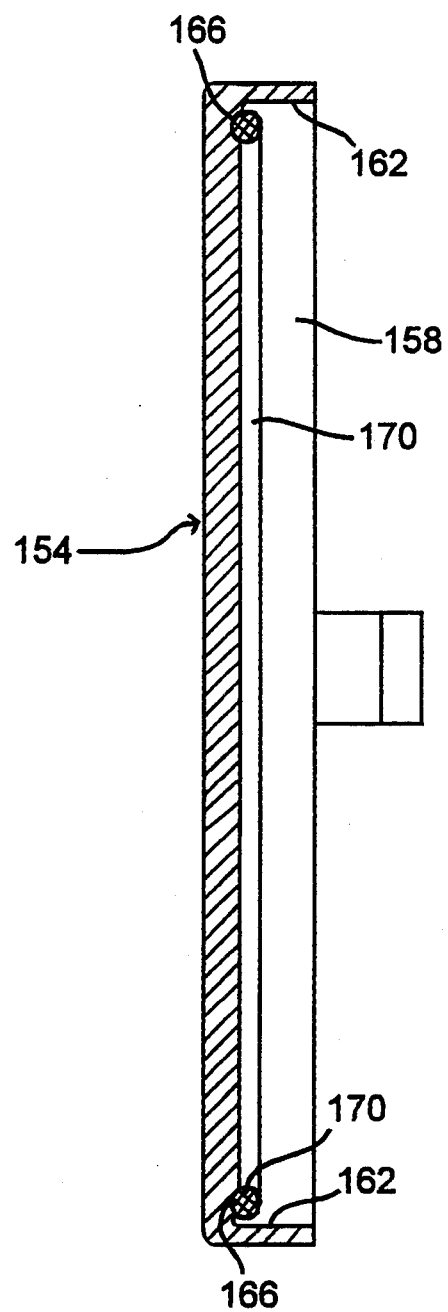
FIG. 6 is a cross-sectional view of the door of FIG. 4 with the sealing ring installed in the sealing ring groove.

Referring now to FIG. 4, a second embodiment of the invention is disclosed. This embodiment is much the same as described above with the following differences. A base 138 includes a planar outside surface 142 which includes access openings 146 and a ground opening 150, but does not include a gasket recess as described in the first embodiment. A door 154 includes a planar inside surface 158 and a flange 162 extending generally perpendicularly to and outwardly from the inside surface 158 along the perimeter of the door 154. Referring now to FIG. 5, the door 154 includes a groove 166 on its inside surface 158. The groove 166 is immediately adjacent the flange 162. As shown in FIG. 6, a sealing ring 170 is received in the groove 166 and attached by means such as glue. The sealing ring 170 is formed as a continuous loop having no ends which must be connected together. A portion of the sealing ring 170 extends outward from the inside surface 158 such that it is pressed tightly against the planar outside surface 142 of the base 138 when the door 154 is latched in the closed position thereby sealing the access openings 146 and ground opening 150 against the ingress of dust and liquids.

Figure 7:
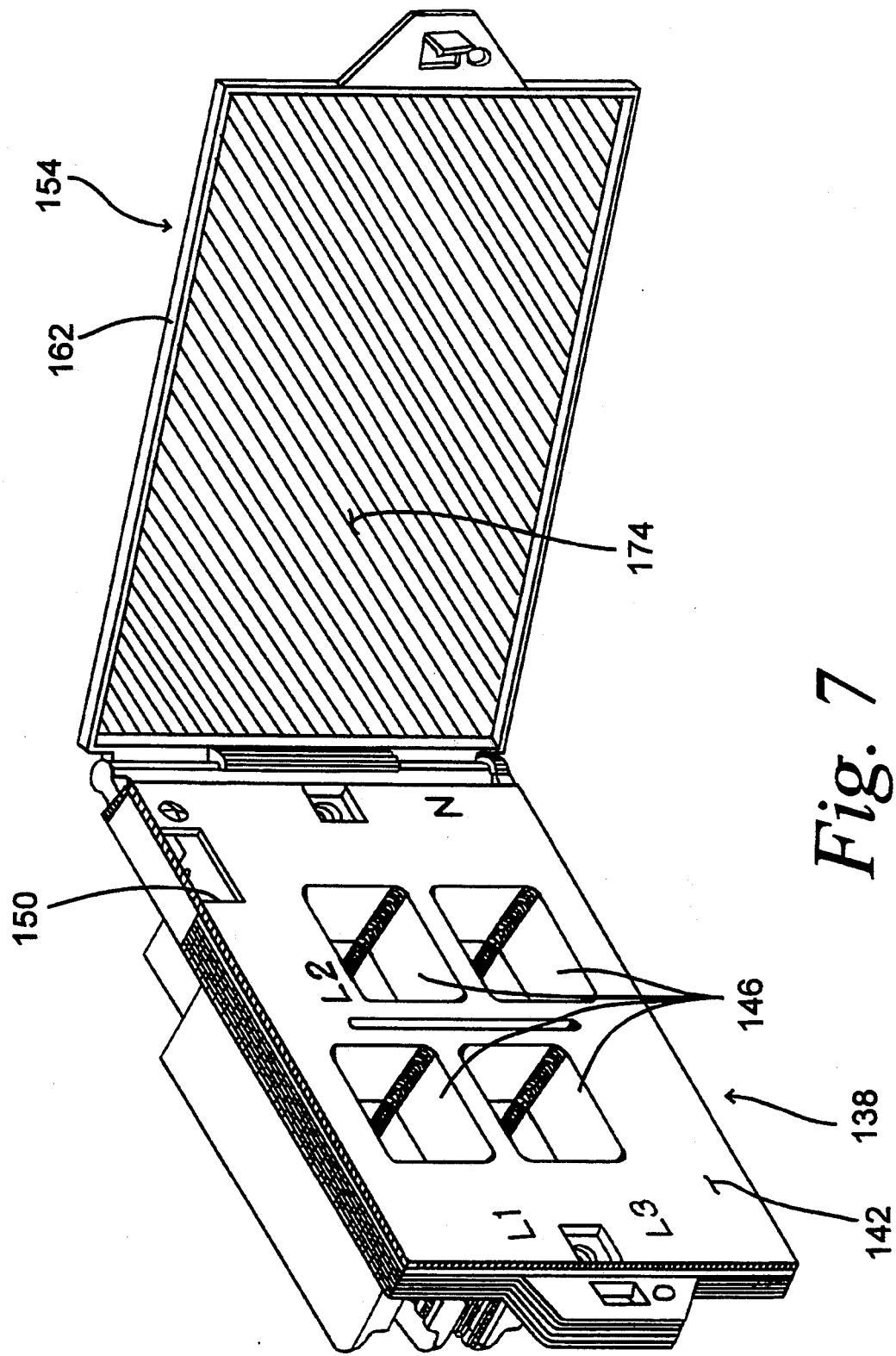
FIG. 7 is an isometric view of a tap-off base assembly of the present invention showing a gasket which completely covers the inside surface of the door.

Referring now to FIG. 7, a third embodiment of the invention is illustrated. In this embodiment a gasket 174 is attached to the inside surface 158 of the door 154. The gasket 174 is sized to completely cover the inside surface 158 and fits within the flange 162. When the door 154 is in the closed position the gasket 174 presses against the planar outside surface 142 of the base 138 thereby sealing the access openings 146 and ground opening 150 against the ingress of dust and liquids.

We claim:

1. A tap-off base assembly providing protection against the ingress of dust and liquids into an electrical busway distribution system having a plurality of electrical conductors enclosed within a housing, said tap-off base assembly comprising:

a portion of said housing defining a tap-off opening for providing access to said conductors;

a tap-off opening seal positioned on said housing portion such that it surrounds said tap-off opening;

a base molded from an electrically insulating material said base having a sealing surface conforming generally in shape to the surface of said busway housing portion proximate said tap-off opening, a planar outside surface, a plurality of access openings defined by said planar outside surface, each said access opening providing access to one of said electrical conductors, a portion of said base defining a latch hole, said base being slidably received within said tap-off opening of said housing portion such that said sealing surface engages said tap-off opening seal whereby a seal is formed between said housing portion and said base;

a generally flat door having a perimeter flange and an integrally formed pivotal latching lever having a distal end forming a hook-like projection;

means for pivotally attaching said door to said base such that it may be selectively moved between an open position providing access to said conductors and a closed position prohibiting access to said conductors, said latching lever pivotally cooperating with said latch hole such that said hook-like projection engages a portion of said base thereby securing said door in said closed position;

means for sealing said access openings against the ingress of dust and liquids when said door is latched in the closed position; and means for attaching said tap-off base assembly to said housing portion.

2. The tap-off base assembly of claim 1 wherein said door further comprises a generally planar inside surface juxtaposed to said planar outside surface of said base when said door is in the closed position, and wherein said flange is generally perpendicular to and extends outwardly from said inside surface of said door such that it overlaps an edge of said base.

3. The tap-off base assembly of claim 2 wherein said means for sealing said access openings further comprises;

a gasket;

a gasket recess for receiving said gasket, said recess surrounding said access openings in said base; and a sealing rib extending generally perpendicular to and outwardly from said inside surface of said door such that when said door is latched in the closed position said sealing rib surrounds said access openings and is pressed against said gasket thereby sealing said access openings against the ingress of dust and liquids.

4. The tap-off base assembly of claim 2 wherein said means for sealing said access openings further comprises;

a recessed groove in said inside surface of said door immediately adjacent said perimeter flange;

a sealing ring received in said groove, said sealing ring being a continuous loop; and means for attaching said sealing ring to said door;

said sealing ring being pressed against said planar outside surface of said base when said door is latched in the closed position where by said access openings are sealed against the ingress of dust and liquids.

5. The tap-off base assembly of claim 2 wherein said means for sealing said access openings further comprises;

a gasket attached to and substantially covering said inside surface of said door such that said gasket is pressed against said planar outside surface of said base when said door is in the closed position thereby sealing said access openings against the ingress of dust and liquids.

6. The tap-off base assembly of claim 1 wherein said base assembly further includes means for indicating unauthorized opening of said door, said means comprising:

a sealing wire;

a portion of said base defining a sealing wire hole; and a portion of said door defining a sealing wire hole, both said base sealing wire hole and said door sealing wire hole being aligned for receiving said sealing wire only when said door is in the closed position, said sealing wire having a length such that said door can not be moved to the open position without cutting said sealing wire thereby indicating unauthorized opening of said door by the removal of said sealing wire.

7. A tap-off base assembly providing protection against the ingress of dust and liquids into an electrical busway distribution system having a plurality of electrical conductors enclosed within a housing, said tap-off base assembly comprising:

a portion of said housing defining a tap-off opening for providing access to said conductors;

a tap-off opening seal positioned on said housing portion such that it surrounds said tap-off opening;

a base molded from an electrically insulating material said base having a sealing surface conforming generally in shape to the surface of said busway housing portion proximate said tap-off opening, a planar outside surface, a plurality of access openings defined by said planar outside surface, each said access opening providing access to one of said electrical conductors, a gasket recess defined in said outside surface such that said recess surrounds said access openings, a portion of said base defining a latch hole, said base being slidably received within said tap-off opening of said housing portion such that said sealing surface engages said tap-off opening seal whereby a seal is formed between said housing portion and said base;

a generally fiat door having a planar inside surface, a sealing rib extending generally perpendicular to and outwardly from said planar inside surface and being complementary in shape to said gasket recess, and an integrally formed pivotal latching lever having a distal end forming a hook-like projection;

means for pivotally attaching said door to said base such that it may be selectively moved between an open position providing access to said conductors and a closed position prohibiting access to said conductors, said latching lever pivotally cooperating with said latch hole such that said hook-like projection engages a portion of said base thereby securing said door in said closed position;

a gasket generally conforming in shape to said gasket recess of said base and being received therein such that when said door is latched in said closed position said sealing rib is pressed into said gasket thereby sealing said access openings against the ingress of dust and liquids; and means for attaching said tap-off base assembly to said housing portion.

8. A tap-off base assembly providing protection against the ingress of dust and liquids into an electrical busway distribution system having a plurality of electrical conductors enclosed within a housing, said tap-off base assembly comprising:

a portion of said housing defining a tap-off opening for providing access to said conductors;

a tap-off opening seal positioned on said housing portion such that it surrounds said tap-off opening;

a base molded from an electrically insulating material said base having a sealing surface conforming generally in shape to the surface of said busway housing portion proximate said tap-off opening, a planar outside surface, a plurality of access openings defined by said planar outside surface, each said access opening providing access to one of said electrical conductors, a gasket recess defined in said outside surface such that said recess surrounds said access openings, said base being slidably received within said tap-off opening of said housing portion such that said sealing surface engages said tap-off opening seal whereby a seal is formed between said housing portion and said base;

a generally flat door having a planar inside surface, a sealing rib extending generally perpendicular to and outwardly from said planar inside surface and being complementary in shape to said gasket recess;

means for pivotally attaching said door to said base such that it may be selectively moved between an open position providing access to said conductors and a closed position prohibiting access to said conductors;

means for latching said door in said closed position;

a gasket generally conforming in shape to said gasket recess of said base and being received therein such that when said door is latched in said closed position said sealing rib is pressed into said gasket thereby sealing said access openings against the ingress of dust and liquids; and means for attaching said tap-off base assembly to said housing portion.

* * * * *